United States Patent

[11] 3,556,472

| [72] | Inventors | Marvin H. Grove;<br>Lyle R. Van Arsdale, Houston, Tex. |
|---|---|---|
| [21] | Appl. No. | 779,783 |
| [22] | Filed | Nov. 29, 1968 |
| [45] | Patented | Jan. 19, 1971 |
| [73] | Assignee | M & J Valve Company<br>Houston, Tex.<br>a corporation of Delaware<br>Continuation-in-part of application Ser. No.<br>689,487, Dec. 11, 1967, now abandoned. |

[54] GATE VALVE WITH LOOSELY RETAINED ROD SEAL
4 Claims, 4 Drawing Figs.

[52] U.S. Cl. ........................................................ 251/214,
251/326, 251/329
[51] Int. Cl. ........................................................ F16k 41/04,
F16k 3/00
[50] Field of Search .......................................... 251/326,
329, 214; 277/174

[56] References Cited
UNITED STATES PATENTS

| 2,889,134 | 6/1959 | Bryant ........................ | 251/O-ring |
| 3,063,080 | 11/1962 | Bergman et al. ............ | 251/326X |
| 3,186,724 | 6/1965 | Wheatley ................... | 277/59 |
| 3,379,405 | 4/1968 | Natho ........................ | 251/327X |

FOREIGN PATENTS

| 817,426 | 7/1959 | Great Britain .............. | 251/214 |

*Primary Examiner*—Arnold Rosenthal
*Attorney*—Flehr, Hohbach, Test, Albritton & Herbert ABSTRACT: A gate valve having a bonnet assembly which includes an annular member through which the rod extends and which is retained in such a manner as to permit self-aligning movements relative to the body. Fluid pressure seals of the O-ring type prevent leakage between the rod and the annular member, and between the periphery of the annular member and the surrounding part of the bonnet assembly.

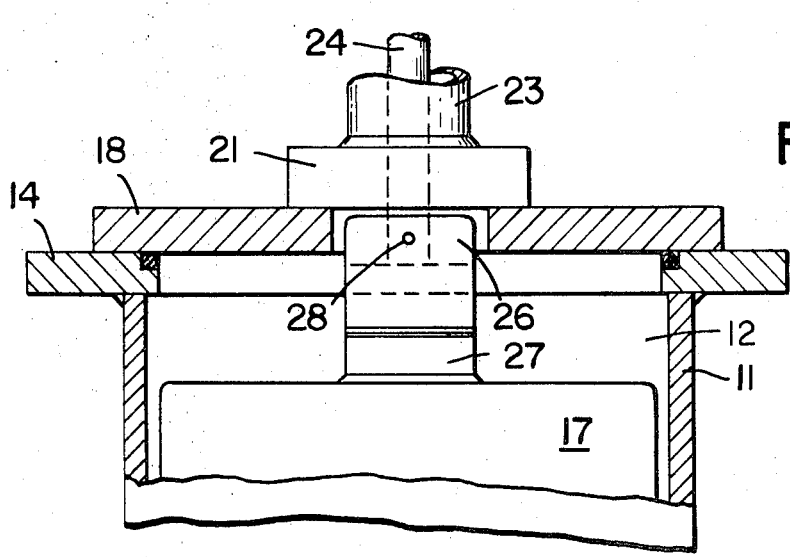
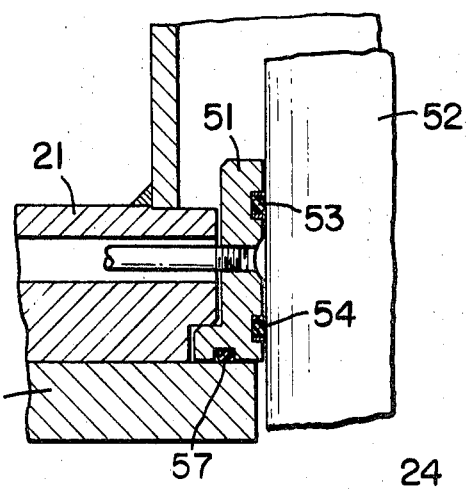
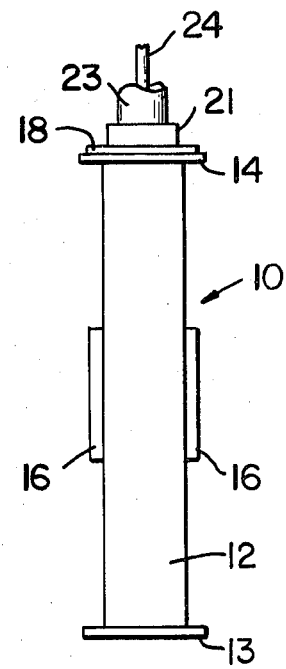
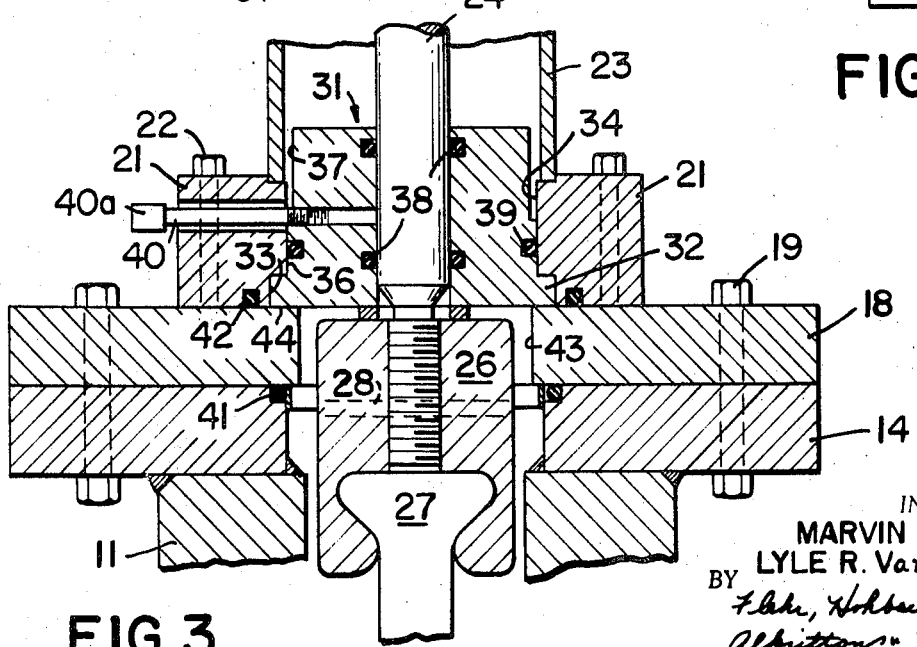
FIG. 2
FIG. 4
FIG. 1
FIG. 3

3,556,472

GATE VALVE WITH LOOSELY RETAINED ROD SEAL

CROSS-REFERENCE TO RELATED APPLICATIONS

This application is a continuation-in-part of our copending application Ser. No. 689,487 filed Dec. 11, 1967 for "Gate Valve", and now abandoned.

BACKGROUND OF THE INVENTION

Conventional gate valves employ a bonnet assembly on one end of the body through which the operating rod extends. In the older designs a so-called stuffing gland was provided to prevent leakage past the valve rod. In the more recent designs one or more seals of the resilient O-ring type have been substituted for packing glands. Examples of such seals are shown in U.S. Pats. Nos. 3,279,747 and 3,339,882. In both examples the bonnet assembly includes a platelike part which is bored to accommodate the valve-operating rod and which is recessed to accommodate seals of the resilient O-ring type. When gate valves are made in the larger sizes, as by fabricating methods, it has been found difficult to manufacture and assemble the parts with sufficient accuracy to provide the necessary alignment between the operating stem and that part of the bonnet assembly through which the stem extends. Any slight misalignment between the operating stem and the rigid part through which it extends may cause jamming, excessive friction, ore or excessive wear of the rod.

SUMMARY OF THE INVENTION AND OBJECTS

This invention relates generally to construction of gate valves, and particularly to gate valves made in the larger sizes and of fabricated construction.

It is an object of the invention to provide a gate valve of the above character having novel means for preventing leakage between the operating rod and the adjacent parts of the bonnet assembly, and which in particular will provide self-aligning action to prevent jamming, excessive friction or excessive wear of the operating rod.

Another object of the invention is to provide a valve of the above character in which the rod-sealing means is incorporated in a novel manner with the bonnet assembly for a valve body of the fabricated type.

Another object is to provide a valve rod-sealing assembly which permits the use of relatively hard durable material like nylon, in place of more resilient but less durable material.

Additional objects and features of the invention will appear from the following description in which the preferred embodiment has been set forth in detail in conjunction with the accompanying drawing.

BRIEF DESCRIPTION OF THE DRAWING

FIG. 1 is a side elevational view, partly in section, illustrating a gate valve incorporating the present invention;

FIG. 2 is a part section of the valve shown in FIG. 1, looking toward one end of the same;

FIG. 3 is a detail in section on an enlarged scale showing details of the bonnet assembly; and FIG. 4 is a detail in section showing a modified construction.

DESCRIPTION OF THE PREFERRED EMBODIMENT

The gate valve illustrated in the drawing is of the fabricated body type. The body 10 is boxlike and formed from the rectangular end walls 11 which are secured at their side edges to the sidewalls 12. The lower end of the body is closed as by means of the welded-on bottom plate 13. The upper end of the body is provided with a welded-on flange 14 upon which the bonnet assembly is clamped. The end walls have aligned openings 16 forming flow passages.

The valve gate 17 within the body is flat or slablike and is movable between open and closed positions relative to the openings 16. This gate may be of the through-port type provided with a port which registers with the openings 16 for full open position of the gate.

The bonnet assembly disposed upon the upper end of the valve includes the bonnet plate 18 which is clamped to the flange 14 by bolts or capscrews 19. Another platelike mounting member 21 is secured to the plate 18 by the bolts or capscrews 22. The member 21 may serve to mount parts of a valve operator, such as manual operating means or an operator of the power type. A pipe 23 is shown having its lower end secured to member 21 and may serve either the function of a yoke for a hand operator, or as the cylinder of a piston-cylinder hydraulic operator.

The operating stem 24 extends through the bonnet assembly and has its inner end coupled to the corresponding end of the gate 17. In the particular construction illustrated, the rod 24 has threaded engagement with a head 26 which is slotted to accommodate the T-bar 27. The T-bar in turn is secured as by welding to the corresponding end of the gate 17. A lock pin 28 is shown extending through the head 26 and the adjacent threaded portion of the operating rod to prevent disengagement of these parts.

Surrounding the operating rod 24 there is a bushinglike annular member 31 which can be formed of suitable metal. The lower end of this member 31 is formed with a flange 32 which is accommodated within a recess 33 formed in the mounting member 21. Also the mounting member 21 is provided with a bore 34 which is concentric with the operating rod 24 and which accommodates the main body of member 31. It will be noted that the main body of member 31 is formed on two diameters, one being represented by the peripheral surface 36, and the other by surface 37. Surface 36 has a loose fit within the bore 34, and the peripheral surface 37 is made to a smaller diameter and therefore provides greater clearance with respect to the bore 34.

The bushing member 31 is sealed with respect to the operating rod 24 as by seal rings 38 of the resilient O-ring type. Also the periphery of bushing member 31 is sealed with respect to the bore 34 by a seal ring 39 of the resilient O-ring type. Lubricant may be introduced between O-ring 38 through tube 49, which has a lubricant filling 40a on its outer end. Suitable sealing means is also provided to prevent leakage between the flange 14 and bonnet plate 18, and the bonnet plate and mounting member 21. Thus a seal ring 41 is shown forming a seal between flange 14 and plate 18, and another seal 42 of the O-ring type to prevent leakage between plate 18 and member 21. The O-rings 39 and 41 can be made of relatively resilient material such as a synthetic rubber or elastomer.

It will be noted that the plate 18 has an opening 43 which is ample to accommodate the head 26. However, the dimensions are also such as to provide a shoulder 44 which seats the lower end of the bushing member 31.

The dimensions used in machining the bushing member 31 and associated parts are such that the bushing member is permitted universal self-aligning movement. In other words, it has some freedom of self-aligning movement with respect to the bonnet plate 18 and the mounting member 21. In general the axis of the bushing member 31 remains in alignment with the rod, although in operation the floating bushing permits limited misalignment or lateral movements of the rod axis relative to the body. Such self-aligning action prevents undue friction between the bushing member and the operating rod 21, with resulting excessive wear, even though other parts of the valve assembly may not be sufficiently accurate for proper alignment. In this connection it will also be noted that the coupling between the operating rod and the gate provides for limited articulation, with the result that the axis of the operating rod need not be precisely in alignment with the central longitudinal axis of the gate.

Because of the action described above, it has been found possible and we prefer to use relatively hard resilient material such as nylon for the lower one or for both of the O-rings. 38. The use of nylon with the floating bushing feature provides an effective long-lasting seal capable of use with relatively high pressures since the bushing remains in alignment with the operating rod. Teflon is another type of hard resilient material that can be used.

It will be evident from the foregoing that out our construction provides an effective fluid pressure seal about the operating rod and that this is accomplished with a relatively simple bonnet assembly. Minor inaccuracies in the construction of the parts, or in their assembly, will not interfere with proper sealing action and will not cause undue friction or wear of the operating stem.

In the modified construction of FIG. 4 the bushing 51 surrounds the valve operating rod 52 and seals 53 and 54 are provided. The flange 56 at the lower end of the bushing is sealed with respect to plate 18 by seal means 57 of the resilient O-ring type. Here again the bushing is self-aligning or free floating.

In some instances it may be desirable to effect an emergency seal about the rod pending replacement of seal rings. For this purpose a suitable plastic sealant can be forced through pipe 40 into the space about the rod 24 and between the two O-ring 38.

We claim:

1. In a gate valve, a valve body having end and sidewalls, the end walls having openings forming flow passages, a gate within the body and movable between open and closed operating positions, a flange secured to one end of the body, a bonnet assembly mounted on said flange and including two platelike parts, an operating rod extending through the bonnet assembly and having its inner end connected to the gate, and self-aligning means within the bonnet assembly to prevent leakage of fluid pressure about the rod, said means comprising a rigid annular member having a central opening to accommodate the rod, the platelike members of the bonnet assembly being formed to loosely surround and retain said annular member for self-aligning movements and forming means for retaining the annular member against movement in the direction of the axis of the rod, sealing means forming a fluid pressure seal to prevent leakage between the annular member and the platelike bonnet parts, and sealing means forming a fluid pressure seal between the annular member and the operating rod, the retention of said annular member by said platelike parts permitting limited aligning movements of the annular member relative to the valve body.

2. A valve as in claim 1 in which the annular member is formed with a flange, the platelike parts being formed with an annular recess to accommodate said flange.

3. A valve as in claim 1 in which the first named sealing means is of the resilient O-ring type.

4. A valve as in claim 3 in which the sealing means between the annular member and the rod includes a seal ring made of relatively hard material like nylon.